United States Patent
Kong et al.

(10) Patent No.: US 11,137,205 B2
(45) Date of Patent: Oct. 5, 2021

(54) METHOD AND APPARATUS FOR ELIMINATING HEAT BUMPS FOLLOWING REGENERATION OF ADSORBERS IN AN AIR SEPARATION UNIT

(71) Applicant: L'Air Liquide, Societe Anonyme pour l'Etude et l'Exploitation des Procedes Georges Claude, Paris (FR)

(72) Inventors: Paul Kong, Sugar Land, TX (US); Minh Huy Pham, Houston, TX (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 346 days.

(21) Appl. No.: 16/229,481

(22) Filed: Dec. 21, 2018

(65) Prior Publication Data
US 2020/0200473 A1 Jun. 25, 2020

(51) Int. Cl.
*F25J 3/04* (2006.01)
*B01D 53/04* (2006.01)

(52) U.S. Cl.
CPC ...... *F25J 3/04181* (2013.01); *B01D 53/0462* (2013.01); *F25J 3/0406* (2013.01);
(Continued)

(58) Field of Classification Search
CPC ............ B01D 53/04; B01D 53/0438; B01D 53/0462; B01D 2256/10; B01D 2256/12;
(Continued)

(56) References Cited

U.S. PATENT DOCUMENTS 3,685,256 A * 8/1972 Barrere, Jr. ............ B01D 53/04
95/143
3,738,084 A 6/1973 Simonet et al.
(Continued)

FOREIGN PATENT DOCUMENTS

DE 20 2004 013214 11/2004
DE 2020 0401 3214 11/2004
(Continued)

OTHER PUBLICATIONS

EP Search Report for EP 19217332, dated Apr. 23, 2020.
(Continued)

*Primary Examiner* — Frank M Lawrence, Jr.
(74) *Attorney, Agent, or Firm* — Justin K. Murray

(57) ABSTRACT

A method for reducing heat bumps following regeneration of adsorbers in an air separation unit is provided. The air separation unit can include a front end purification unit, a main air compressor, a main heat exchanger, a distillation column system, a regeneration gas heater, and a regeneration gas cooler, wherein the front end purification unit comprises a first adsorber and a second adsorber. The method can include the steps of: regenerating the first adsorber while the second adsorber operates in an adsorption cycle, wherein the step of regenerating the first adsorber further includes the steps of heating the first adsorber and then cooling the first adsorber, wherein during the step of cooling the first adsorber, a regeneration gas sourced from the distillation column system and cooled in the main heat exchanger is further cooled in a regeneration gas cooler prior to being used to cool the first adsorber.

5 Claims, 2 Drawing Sheets

(52) U.S. Cl.
CPC ....... *F25J 3/04018* (2013.01); *F25J 3/04024* (2013.01); *F25J 3/04066* (2013.01); *F25J 3/04109* (2013.01); *F25J 2230/40* (2013.01)

(58) Field of Classification Search
CPC .......... B01D 2257/504; B01D 2257/80; B01D 2259/4009; B01D 2259/402; F25J 3/04018; F25J 3/04024; F25J 3/0406; F25J 3/04066; F25J 3/04109; F25J 3/04181; F25J 2205/32; F25J 2205/34; F25J 2205/68; F25J 2230/40
USPC .... 95/115, 117, 139, 148; 96/121, 130, 134, 96/143, 144, 146; 62/640, 643, 644
See application file for complete search history.

(56) References Cited

U.S. PATENT DOCUMENTS

| | | | |
|---|---|---|---|
| 4,152,130 A | | 5/1979 | Theobald |
| 4,233,038 A | | 11/1980 | Tao |
| 4,367,082 A | * | 1/1983 | Tomisaka ............... B01D 53/04 62/650 |
| 5,137,548 A | | 8/1992 | Grenier et al. |
| 5,531,808 A | | 7/1996 | Ojo et al. |
| 5,584,194 A | * | 12/1996 | Gardner ............. C01B 23/0094 62/615 |
| 5,587,003 A | | 12/1996 | Bulow et al. |
| 5,689,974 A | | 11/1997 | Fujita et al. |
| 5,906,674 A | | 5/1999 | Tan et al. |
| 6,073,463 A | | 6/2000 | Espie |
| 6,077,488 A | * | 6/2000 | Jain ..................... F25J 3/04169 423/210 |
| 6,155,078 A | * | 12/2000 | Miyashita ............ F25J 3/04157 62/643 |
| 6,393,867 B1 | | 5/2002 | Guillard |
| 6,599,347 B2 | | 7/2003 | Kalbassi et al. |
| 6,607,582 B2 | | 8/2003 | Massimo et al. |
| 6,821,316 B2 | | 11/2004 | Guillard et al. |
| 7,846,237 B2 | | 12/2010 | Wright et al. |
| 9,795,915 B2 | | 10/2017 | Kalbassi et al. |
| 10,035,099 B2 | | 7/2018 | Yoshikawa et al. |
| 2003/0029314 A1 | * | 2/2003 | Nakamura ........... F25J 3/04169 95/117 |
| 2004/0221612 A1 | | 11/2004 | Jaouani et al. |
| 2010/0024640 A1 | | 2/2010 | Blouin |
| 2012/0011887 A1 | * | 1/2012 | Nakamura ........... B01D 53/261 62/640 |
| 2013/0319228 A1 | | 12/2013 | Golden et al. |
| 2014/0013798 A1 | * | 1/2014 | Le Bot ................. F25J 3/04054 62/643 |
| 2015/0283497 A1 | * | 10/2015 | Hashi ................... F25J 3/04018 95/41 |
| 2017/0087505 A1 | | 3/2017 | Hashi et al. |
| 2017/0276428 A1 | | 9/2017 | Kong et al. |

FOREIGN PATENT DOCUMENTS

| | | |
|---|---|---|
| EP | 0 004 465 | 10/1979 |
| FR | 2 849 172 | 6/2004 |
| WO | WO 2007 033 838 | 3/2007 |

OTHER PUBLICATIONS

"Oxygen Enrichment of Air: Process Developments and Economic Trends," Research Disclosure, Kenneth Mason Publications, No. 417, Jan. 1, 1999, pp. 94-101.

EP Search Report for EP 19217421, dated Apr. 24, 2020.

Anonymous, "Method of Repressurising the Pretreatment PSA of a Cryogenic Air Separation Unit," originally published in Research Disclosure, Jun. 1999, p. 640, publ. No. 42160; ip.com Prior Art Database Technical Disclosure, IP.com No. IPCOM000019388D, IP.com Electronic Publication Date: Sep. 12, 2003.

* cited by examiner

METHOD AND APPARATUS FOR ELIMINATING HEAT BUMPS FOLLOWING REGENERATION OF ADSORBERS IN AN AIR SEPARATION UNIT

TECHNICAL FIELD OF THE INVENTION

The present invention generally relates to an apparatus and process for improving the operation of an air separation unit during the cooling step of the adsorber regeneration cycle.

BACKGROUND OF THE INVENTION

For an air separation unit (ASU) facility to produce gaseous products (e.g., gaseous oxygen (GOX), gaseous nitrogen (GAN)), liquid products such as liquid oxygen (LOX) and/or liquid nitrogen (LIN) are vaporized against high pressure (HP) air from a booster air compressor (BAC) in a main heat exchanger.

FIG. 1 provides a representation of a process known heretofore. Referring to FIG. 1, compressed wet air 2 from a main air compressor (MAC) 10 is cooled to approximately 53° F. by chilled water 62 in a direct contact tower 20 and then is sent to a front end purification (FEP) unit 30 via line 22 to produce moisture and carbon dioxide free dry air 32 at 64° F. Warmed water 24 is then sent to chiller water tower 60 for cooling therein against a low pressure nitrogen stream 52 from distillation column 50, after low pressure nitrogen stream 52 was warmed against incoming air streams in the main heat exchanger.

A portion of dry air 36 is further compressed by BAC 35 and cooled to approximately 95° F. by cooling water in a BAC after cooler 37. Boosted air 36 (or HP air) and the remaining dry air 34 from FEP unit 30 are then sent to main exchanger 40 where they are cooled by heat exchange with cold outgoing streams (52, 54) from the distillation column. The percentage of boosted air can vary between 35% and 65% of the total air to the cold box depending on amount of cryogenic liquid product to be produced. Optionally, up to all of the dry air from the FEP unit 30 can be compressed in the absence of a BAC by a turbine booster (not shown) before being sent to the main exchanger.

FEP adsorbers are operated alternatively between adsorption A and regeneration R cycle. In regeneration cycle, adsorber R is regenerated by a waste nitrogen gas 54 from distillation column system 50 after it is warmed in the main exchanger to remove moisture and carbon dioxide accumulated during the adsorption cycle. Regeneration cycle consists of heating and cooling phases.

In the heating phase, valve 47 is closed and valve 45 is opened, such that regeneration gas 42 flow via line 44, where it is heated by a regeneration heater 43 before being sent to the adsorber R.

In the cooling phase, valve 45 is closed and valve 47 is opened such that regeneration gas 42 flows via line 46. This cools the adsorber R close to the temperature of stream 54 when exiting the heat exchanger, which is approximately at least 15° F. higher than the normal adsorption temperature (i.e., the temperature of air in line 22). Therefore, embodiments of the prior art do not sufficiently cool down the adsorber prior to switchover. This has few major drawbacks:

- A temperature excursion (or heat bump) in the dry air causes a process upset to BAC, turbine booster and equipment within the cold box (e.g., heat exchanger and distillation column system);
- In order to minimize this temperature disturbance, BAC 35 is usually purposely oversized (as much as 5%) to accommodate the increase of the inlet temperature; and
- The heat bump is particularly pronounced and upsets the distillation when argon is produced.

One method for dealing with this heat bump in the prior art is to remove the waste nitrogen stream from the main heat exchanger at a colder temperature; however, this results in a less efficient heat exchange and higher heat duty in a heating step of the regeneration cycle.

Therefore, it would be desirable to have an improved apparatus and method that avoids these process disturbances and operates in an overall more efficient manner.

SUMMARY OF THE INVENTION

The present invention is directed to a method and apparatus that satisfies at least one of these needs. In one embodiment of the present invention, the waste nitrogen (or regeneration) gas can be cooled using chilled water in a regeneration cooler (waste nitrogen gas cooler) so that the adsorber can be cooled down to substantially the same temperature as during normal adsorption cycle. This means that the dry air temperature exiting the adsorber right after switchover will stay essentially constant.

In one embodiment, the fluid used to cool the regeneration gas is preferably a side stream from the air precooling system, but it can be from any other source. The duty is less than 10% of the air precooling system and can be done without having to increase waste nitrogen gas pressure from the cold box, since the regeneration gas cooler is in parallel with the regeneration gas heater.

In one embodiment, the invention can include a method for reducing heat bumps following regeneration of adsorbers in an air separation unit. In one embodiment, the air separation unit comprises a front end purification unit, a main air compressor, a main heat exchanger, a distillation column system, a regeneration gas heater, and a regeneration gas cooler, wherein the front end purification unit comprises a first adsorber and a second adsorber. In one embodiment, the method can include the step of regenerating the first adsorber while the second adsorber operates in an adsorption cycle, wherein the step of regenerating the first adsorber further comprises the steps of heating the first adsorber and then cooling the first adsorber, wherein during the step of cooling the first adsorber, a regeneration gas sourced from the distillation column system and warmed in the main heat exchanger is cooled in a regeneration gas cooler prior to being used to cool the first adsorber In optional embodiments of the method for reducing heat bumps following regeneration of adsorbers in an air separation unit:

- the regeneration gas is cooled by indirect heat exchange against a cooling fluid; and/or
- the cooling fluid comprises chilled cooling water.

In another aspect of the invention, a method for reducing heat bumps following regeneration of adsorbers in an air separation unit is provided. In one embodiment, the method can include the steps of: compressing an air stream in a main air compressor to form a compressed main air stream; cooling the compressed main air stream in a direct contact water tower to form a wet compressed main air stream; purifying the wet compressed main air stream in the front end purification unit to remove water and carbon dioxide to form a dry main air stream; cooling the dry main air stream in the main heat exchanger by indirect heat exchange to form a cooled air stream; introducing the cooled air stream in the distillation column system under conditions effective for rectification of air into nitrogen and oxygen; withdrawing a waste nitrogen gas from the distillation column system and warming said waste nitrogen gas in the main heat exchanger; wherein each of the adsorbers of the front end purification unit undergoes a processing cycle comprising a regeneration cycle and an adsorption cycle, wherein the regeneration cycle comprises a warming period and a cooling period, wherein during the warming period, the regeneration gas from the main heat exchanger is further warmed in a regeneration heater prior to being introduced to the adsorber that is undergoing regeneration, wherein during the cooling period, the regeneration gas from the main heat exchanger is cooled in a regeneration cooler prior to being introduced to the adsorber that is undergoing regeneration until the adsorber undergoing regeneration reaches a targeted temperature, wherein the targeted temperature is at or above a temperature of the wet compressed main air stream and below a temperature of the regeneration gas exiting a warm end of the main heat exchanger In optional embodiments of the method for reducing heat bumps following regeneration of adsorbers in an air separation unit:

the regeneration gas is cooled by indirect heat exchange against a cooling fluid; and/or
the cooling fluid comprises chilled cooling water.

In another aspect of the invention, an apparatus for reducing heat bumps following regeneration of adsorbers in an air separation unit is provided. In one embodiment, the apparatus can include: a main air compressor configured to compress an air stream to form a compressed main air stream; a direct contact water tower configured to cool the compressed main air stream to form a wet compressed main air stream; a front end purification unit configured to purify the wet compressed main air stream of water and carbon dioxide to form a dry main air stream, wherein the front end purification unit comprises two adsorbers, wherein each adsorber is configured to operate with an adsorption cycle and a regeneration cycle, wherein the regeneration cycle comprises a warming period and a cooling period; a main heat exchanger configured to cool the dry main air stream to a cryogenic temperature suitable for rectification of air; a distillation column system configured to receive the dry main air stream from the main heat exchanger after cooling, wherein the distillation column system is configured to separate the dry main air stream into nitrogen and oxygen; a regeneration gas heater in fluid communication with a warm end of the main heat exchanger and the front end purification unit, wherein the regeneration gas heat is configured to heat a waste nitrogen stream sourced from the distillation column system during the warming period of the regeneration cycle; and a regeneration gas cooler in fluid communication with the warm end of the main heat exchanger and the front end purification unit, wherein the regeneration gas cooler is configured to cool the waste nitrogen stream sourced from the distillation column system during the cooling period of the regeneration cycle.

In optional embodiments of the apparatus, the regeneration gas cooler is in fluid communication with a chiller water tower, such that the regeneration gas cooler is configured to receive a chilled water stream from the chiller water tower.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

Figure 2:
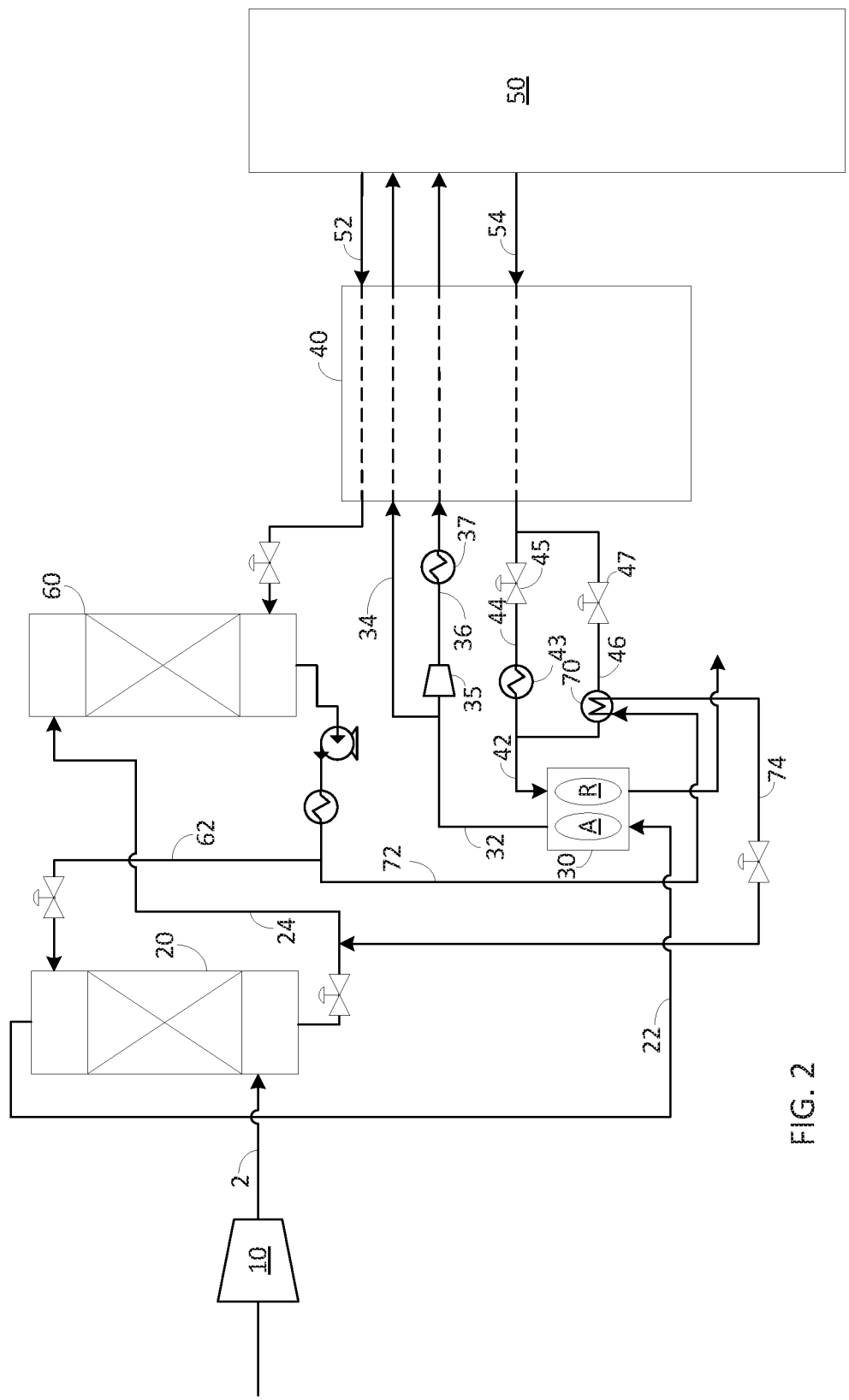
FIG. 2 shows an embodiment of the present invention.

FIG. 2 represents process flow diagram in accordance with an embodiment of the present invention. Referring to FIG. 2, compressed wet air 2 from a main air compressor (MAC) 10 is cooled to approximately 53° F. by chilled water 62 in direct contact tower 20 and then is sent to a front end purification (FEP) unit 30 via line 22 to produce moisture and carbon dioxide free dry air 32 at 64° F. Warmed water 24 is then sent to chiller water tower 60 for cooling therein against a waste stream 52 from distillation column 50.

A portion of dry air 36 is further compressed by BAC 35 and cooled to approximately 95° F. by cooling water in a BAC after cooler 37. Boosted air 36 (or HP air) and the remaining dry air 34 from FEP unit 30 are then sent to main exchanger 40 where they are cooled by heat exchange with cold outgoing streams (52, 54) from the distillation column. The percentage of boosted air can vary between 35% and 65% of the total air to the cold box depending on amount of cryogenic liquid product to be produced. Optionally, at least a portion of the dry air from FEP unit can be compressed in the absence of BAC by a turbine booster (not shown) before being sent to the main exchanger.

FEP adsorbers are operated alternatively between adsorption A and regeneration R cycle. In regeneration cycle, adsorber R is regenerated by a waste nitrogen gas 54 from distillation column system 50 to remove moisture and carbon dioxide accumulated during the adsorption cycle. Regeneration cycle consists of heating and cooling phases.

In the heating phase, valve 47 is closed and valve 45 is opened, such that regeneration gas 42 flow via line 44, where it is heated by a regeneration heater 43 before being sent to the adsorber R.

Figure 1:
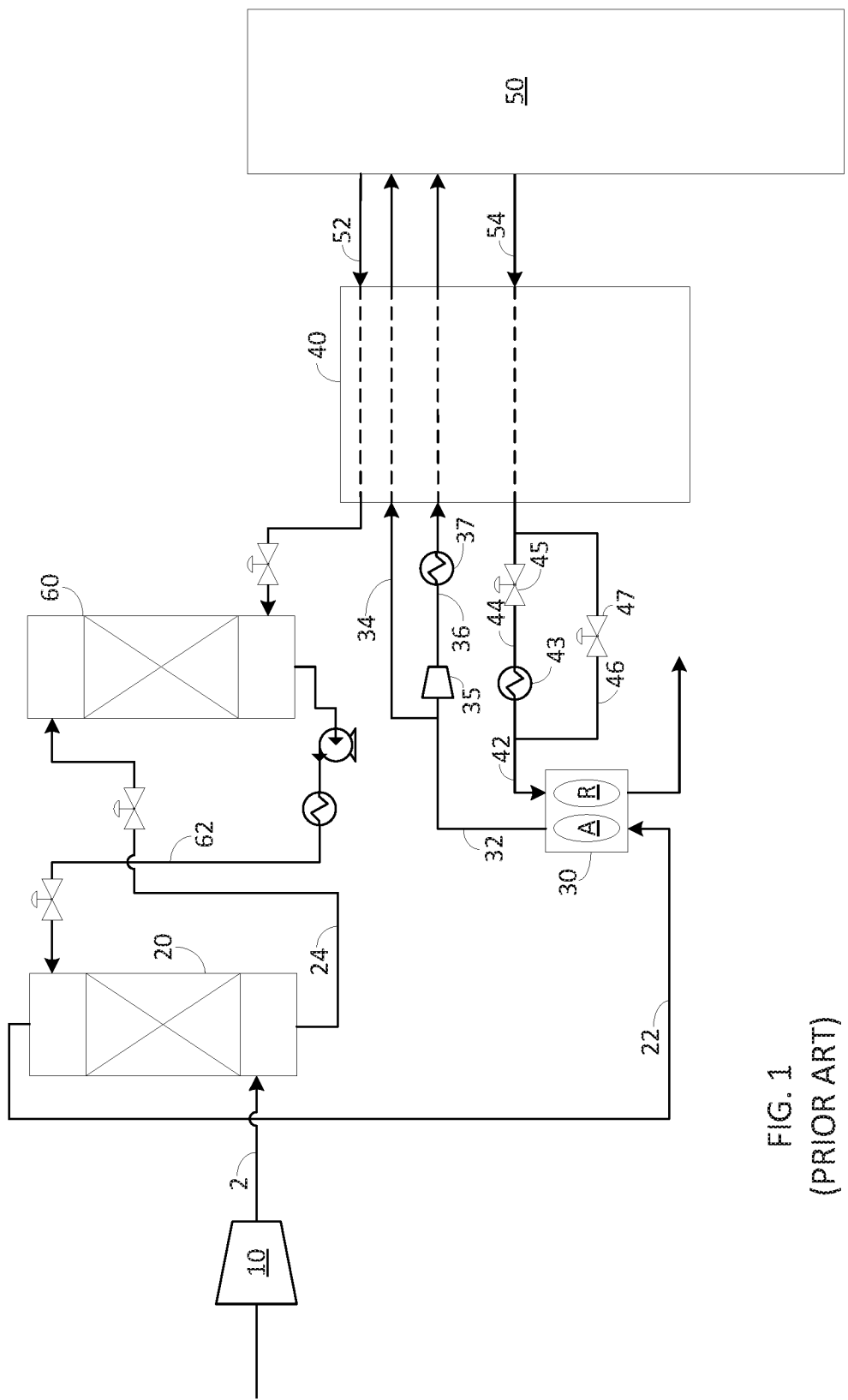
FIG. 1 shows an embodiment of the prior art.

In the cooling phase, valve 45 is closed and valve 47 is opened such that regeneration gas 42 flows via line 46. However, unlike in FIG. 1, the regeneration gas in the embodiment shown in FIG. 2 is further cooled using regeneration gas cooler 70, preferably to a temperature similar to that of the air in line 22. In the embodiment shown, a portion of chilled water 72 is used as the cooling fluid. After cooling the regeneration gas, the portion of chilled water is returned to the water chilling cycle via line 74.

While the embodiment shown in FIG. 2 shows a portion of chilled water 72 being used as the cooling fluid, those skilled in the art will recognize that other sources of a chilled fluid can also be used. For example, the cooling fluid could also be a side stream of refrigerant from a mechanical refrigeration unit in another part of the process or of another nearby unit with excess capacity.

In one embodiment, a regeneration gas cooler is preferably added in parallel with the regeneration gas heater, such that the regeneration gas can be both cooled and heated to appropriate temperatures (i.e., an upper temperature hot enough for desorption and a lower temperature at or near the original adsorption temperature) without having to increase the pressure of the regeneration gas.

As noted previously, embodiments of the present invention are preferable over the alternative of adding a supplemental cooler to the air coming out of the adsorber (e.g., line 32), since that air stream is at a higher pressure than the waste nitrogen stream. By cooling a lower pressure stream (i.e., stream 46 as compared to streams 32, 34, 36), approximately 10% less heat duty is required.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

We claim:

1. A method for reducing heat bumps following regeneration of adsorbers in an air separation unit, wherein the air separation unit comprises a front end purification unit, a main air compressor, a main heat exchanger, a distillation column system, a regeneration gas heater, and a regeneration gas cooler, a main-air direct-contact water cooling system, wherein the front end purification unit comprises a first adsorber and a second adsorber, the method comprising the steps of:
regenerating the first adsorber while the second adsorber operates in an adsorption cycle, wherein the step of regenerating the first adsorber further comprises the steps of heating the first adsorber and then cooling the first adsorber, wherein during the step of cooling the first adsorber, a regeneration gas sourced from the distillation column system and warmed in the main heat exchanger is cooled in a regeneration gas cooler prior to being used to cool the first adsorber,
wherein the main-air direct-contact water cooling system comprises a direct contact tower and a chiller water tower, wherein the main-air direct-contact water cooling system is configured to remove heat of compression from an air stream compressed in the main air compressor by direct contact with cold water,
wherein the regeneration gas is cooled by indirect heat exchange against a cooling fluid,
wherein the cooling fluid comprises cold water from the main-air direct-contact water cooling system.

2. A method for reducing heat bumps following regeneration of adsorbers in an air separation unit, wherein the air separation unit comprises a front end purification unit, a main air compressor, a main-air direct-contact water cooling system, a main heat exchanger, a distillation column system, a regeneration gas heater, and a regeneration gas cooler, wherein the front end purification unit comprises two adsorbers, the method comprising the steps of:
compressing an air stream in a main air compressor to form a compressed main air stream;
cooling the compressed main air stream in a direct contact water tower to form a wet compressed main air stream;
purifying the wet compressed main air stream in the front end purification unit to remove water and carbon dioxide to form a dry main air stream;
cooling the dry main air stream in the main heat exchanger by indirect heat exchange to form a cooled air stream;
introducing the cooled air stream in the distillation column system under conditions effective for rectification of air into nitrogen and oxygen;
withdrawing a waste nitrogen gas from the distillation column system and warming said waste nitrogen gas in the main heat exchanger;
wherein each of the adsorbers of the front end purification unit undergoes a processing cycle comprising a regeneration cycle and an adsorption cycle, wherein the regeneration cycle comprises a warming period and a cooling period,
wherein during the warming period, a regeneration gas from the main heat exchanger is further warmed in the regeneration gas heater prior to being introduced to the adsorber that is undergoing regeneration,
wherein during the cooling period, the regeneration gas from the main heat exchanger is cooled in a regeneration cooler prior to being introduced to the adsorber that is undergoing regeneration until the adsorber undergoing regeneration reaches a targeted temperature, wherein the targeted temperature is at or above a temperature of the wet compressed main air stream and below a temperature of the regeneration gas exiting a warm end of the main heat exchanger,
wherein the main-air direct-contact water cooling system comprises the direct contact tower and a chiller water tower, wherein the main-air direct-contact water cooling system is configured to remove heat from the compressed main air stream by direct contact with cold water,
wherein the regeneration gas is cooled by indirect heat exchange against a cooling fluid,
wherein the cooling fluid comprises cold water from the main-air direct-contact water cooling system.

3. An apparatus for reducing heat bumps following regeneration of adsorbers in an air separation unit, wherein the apparatus comprises:

a main air compressor configured to compress an air stream to form a compressed main air stream;

a main-air direct-contact water cooling system comprising a direct contact water tower and a chiller water tower, wherein the main-air direct-contact water cooling system is configured to remove heat of compression from the compressed main air stream by direct contact with cold water to form a wet compressed main air stream;

a front end purification unit configured to purify the wet compressed main air stream of water and carbon dioxide to form a dry main air stream, wherein the front end purification unit comprises two adsorbers, wherein each adsorber is configured to operate with an adsorption cycle and a regeneration cycle, wherein the regeneration cycle comprises a warming period and a cooling period;

a main heat exchanger configured to cool the dry main air stream to a cryogenic temperature suitable for rectification of air;

a distillation column system configured to receive the dry main air stream from the main heat exchanger after cooling, wherein the distillation column system is configured to separate the dry main air stream into nitrogen and oxygen;

a regeneration gas heater in fluid communication with a warm end of the main heat exchanger and the front end purification unit, wherein the regeneration gas heat is configured to heat a waste nitrogen stream sourced from the distillation column system during the warming period of the regeneration cycle; and a regeneration gas cooler in fluid communication with the warm end of the main heat exchanger and the front end purification unit, wherein the regeneration gas cooler is configured to cool the waste nitrogen stream sourced from the distillation column system during the cooling period of the regeneration cycle, wherein the regeneration gas cooler is in fluid communication with the main-air direct-contact water cooling system, such that the regeneration gas cooler is configured to receive cold water from the main-air direct-contact water cooling system.

4. The method as claimed in claim 1, wherein the adsorption cycle operates at an adsorption temperature, wherein, during the step of cooling the first adsorber, the regeneration gas is cooled to a temperature sufficiently cold by the cooling fluid that the first adsorber is cooled to the adsorption temperature during the step of cooling the first adsorber.

5. The method as claimed in claim 2, wherein the adsorption cycle operates at an adsorption temperature, wherein the targeted temperature is the adsorption temperature.

* * * * *